United States Patent
Underwood

[11] 3,908,532
[45] Sept. 30, 1975

[54] AUTOMATIC BASTER COOKER

[76] Inventor: Paul W. Underwood, 505 W. 14th St., Chicago Heights, Ill. 60411

[22] Filed: Sept. 30, 1974

[21] Appl. No.: 510,587

[52] U.S. Cl. .................................. 99/347; 99/419
[51] Int. Cl.² ..................... A47J 37/10; A47J 37/04
[58] Field of Search .............. 99/345, 346, 347, 419

[56] References Cited
UNITED STATES PATENTS

| | | | |
|---|---|---|---|
| 1,337,122 | 4/1920 | Doak | 99/345 |
| 1,339,625 | 5/1920 | Holloway | 99/419 |
| 1,485,253 | 2/1924 | Devlin | 99/419 |
| 1,819,301 | 8/1931 | Noble | 99/346 |
| 1,836,827 | 12/1931 | Thau | 99/346 |
| 2,075,407 | 3/1937 | Schwartzman | 99/345 |
| 2,350,623 | 6/1944 | Kruea | 99/346 |
| 2,652,765 | 9/1953 | Risco | 99/345 |
| 2,821,904 | 2/1958 | Arcabosso | 99/346 |
| 3,379,118 | 4/1968 | Perez | 99/419 |
| 3,713,378 | 1/1973 | West et al. | 99/346 |

FOREIGN PATENTS OR APPLICATIONS

| | | | |
|---|---|---|---|
| 113,856 | 9/1900 | Germany | 99/345 |

*Primary Examiner*—Billy J. Wilhite
*Attorney, Agent, or Firm*—Wallenstein, Spangenberg, Hattis & Strampel

[57] ABSTRACT

Automatic baster cooker in which meat roasts, fowl and the like are cooked rapidly and economically and basted automatically, with substantial reduction in shrinkage in comparison with cooking and roasting in usual manners. The automatic baster cooker utilizes a roaster vessel or cooking receptacle provided with a close-fitting lid. The meat or fowl is placed in the roaster vessel, and, disposed thereover, a deflector plate is provided which carries a plurality of perforated elongated spikes or tubular members which penetrate into the body of the meat roast or fowl and extend downwardly into the meat. A liquid which serves as a source of steam or flavoring vapors is disposed in the bottom of the roaster vessel. When the latter is heated, the vapors or steam serve to aid in cooking the meat roast or fowl, some passing through the perforations in the spikes or tubular members directly into the body of the meat roast or fowl, and others striking the deflector plate and condensing and flowing over the outer surface of the meat roast or fowl automatically and essentially continuously to baste the same.

8 Claims, 5 Drawing Figures

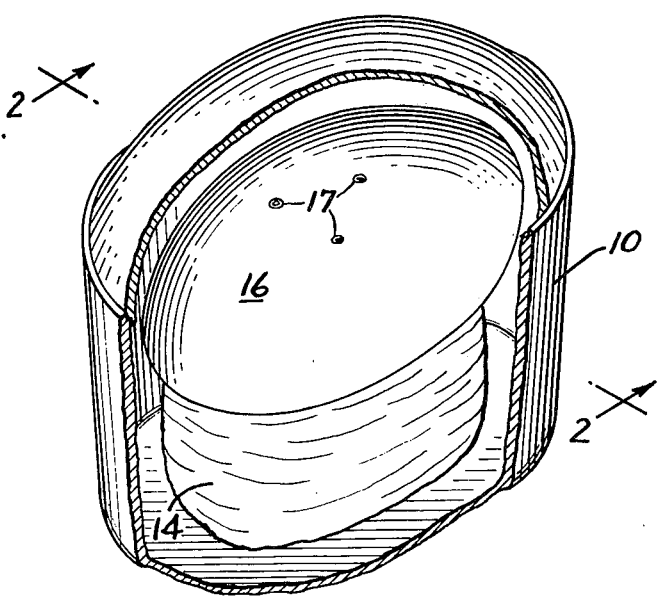
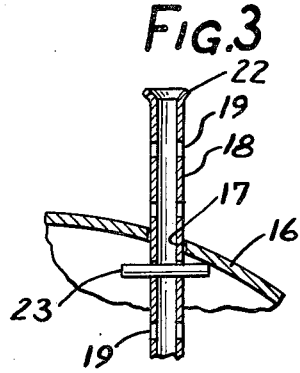
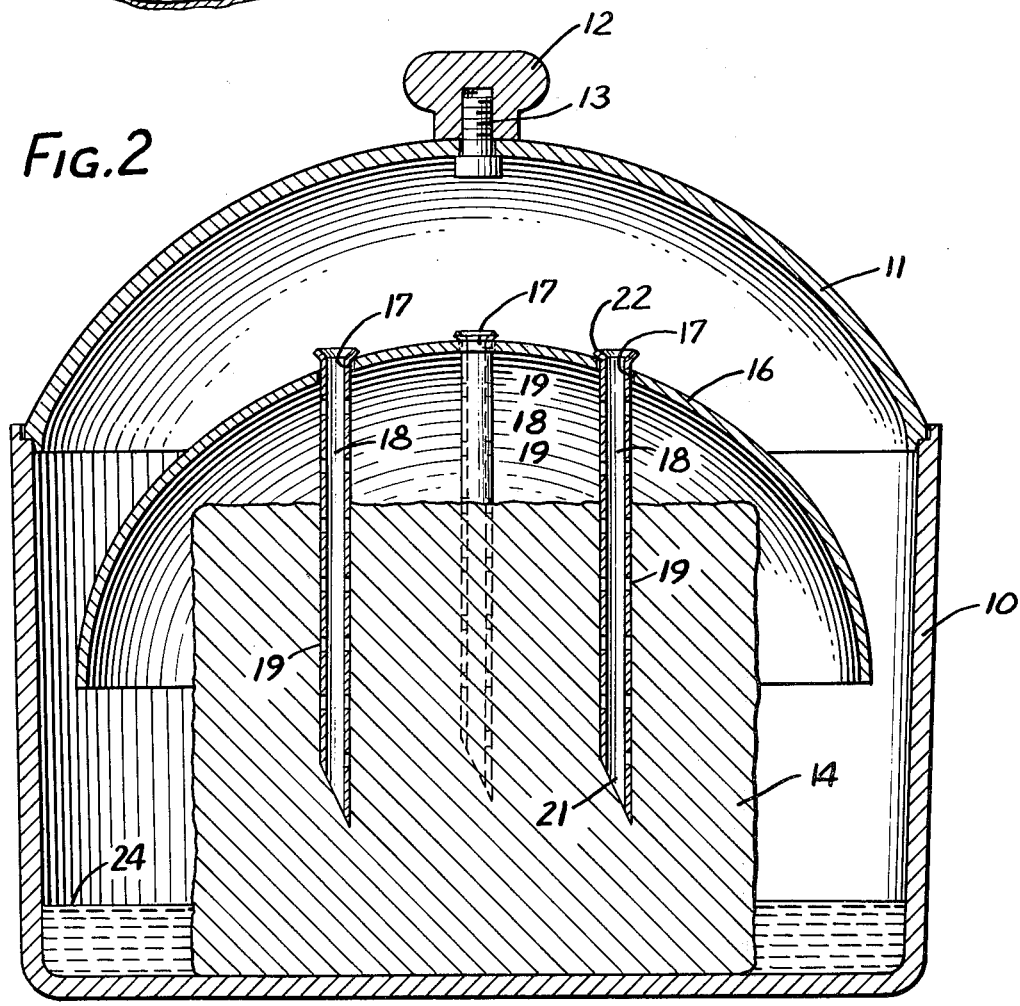

AUTOMATIC BASTER COOKER

Meat roast and fowl cooking devices in which basting and/or flavoring are also effected, through the utilization of perforated spikes or tubular members which are pressed into the body of the meat roast or fowl have, broadly speaking, been known to the art. Such devices, however, possess certain inadequacies from an overall standpoint in that, for example, their main function is to flavor the meat roast or fowl interiorly during a cooking operation and they play little or no role in an overall operation of effectively achieving, conjointly, highly effective automatic basting, together with marked savings in cooking time and, therefore, savings in gas or electricity used for the cooking, and also together with a very substantial reduction in shrinkage of the meat roast or fowl.

The invention will best be understood in conjunction with the drawings in which preferred embodiments are shown and in which:

FIG. 1 is a perspective view of one embodiment of an automatic baster cooker of my invention with the lid partially broken away and with the meat shown positioned in the roaster vessel or cooking receptacle.

FIG. 2 is a vertical section taken along the line 2—2 of FIG. 1 looking in the direction of the arrows.

FIG. 3 is a view showing one illustrative manner in which the spikes or tubular members can be supported on or carried by the dished covering or deflector plate in an adjusted position.

Figure 4:
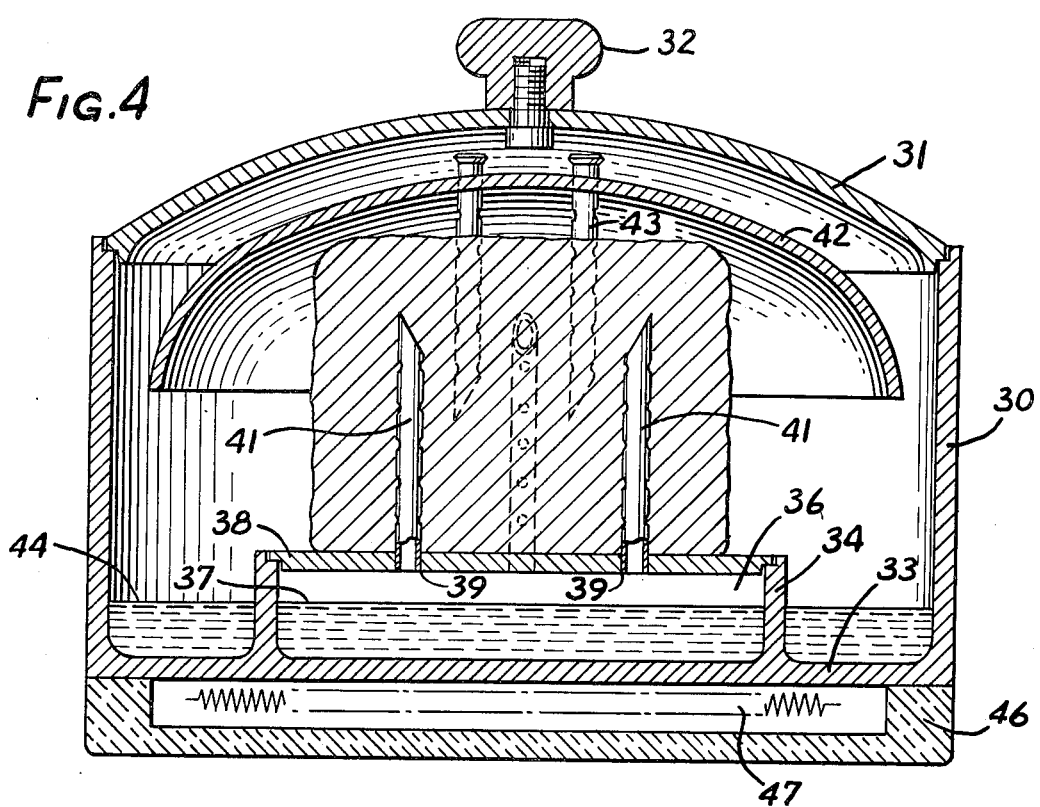
FIG. 4 is a vertical sectional view of another embodiment of the automatic baster cooker of my invention, with the meat positioned therein, and which embodies an electrically heated unit to effect cooking of the meat.

The word "meats," as used hereafter and in the claims, is intended to mean meat roasts, hams, fowl and the like.

Referring, initially, to FIGS. 1 and 2, the automatic baster cooker comprises a roaster vessel or cooking receptacle 10 having a closely fitting removable lid or cover 11 which is provided with a knob 12 for easy handling which knob may be removably attached to the lid by a screw-threaded fastener 13. Disposed within the receptacle 10 is meat 14, which rests on the bottom of the receptacle 10. Overlying the top of the meat roast is a generally downwardly dished covering or deflector plate 16 which is disposed inside the lidded receptacle in spaced relation to the meat. The plate 16 extends around the sides of the upper part of the meat.

The dished plate 16 has a series of spaced openings 17 in the top thereof. While three such openings are shown, there may be two or more and the spacing may be varied. Generally, however, the number and spacing should be such as to enable sufficient inner and relatively uniform cooking of the meat to occur internally in the manner hereafter described. A plurality of individual elongated hollow spikes or tubular members 18 having perforations 19 along their lengths are provided, said spikes 18 being adapted to pass through the apertures in the covering plate 16 and to extend downwardly from said plate and penetrating into the body of the meat 14. The perforations 19 are variable in number, spacing and size in each spike 18. One illustrative convenient arrangement comprises, for instance, in a spike 6 or 7 inches long, 4 or 5 apertures about ¾ to about 1 inch apart along the length of the spike, with a similar number of apertures diametrically opposite on each spike so that each set of the apertures is generally in horizontal alinement, and with apertures having a diameter of about ⅛ to 3/16 inches. The lower ends of the spikes are desirably tapered, as shown at 21, but rounded, whereby to facilitate penetration of the spikes into the meat and at the same time to avoid sharp edges so as to avoid any possible injury. The tops of the spikes are slightly flared, as shown at 22, so as to prevent the movement of the top of the spikes all of the way through the openings 17 in the plate 16. Where the extent of penetration of the spikes into the meat is desired to be limited, or where the thickness of the meat so dictates, the extent to which the spikes 18 extend below the cover can be limited or controlled, as more particularly shown in FIG. 3, by means of a pin 23 which is passed through sets of alined apertures in the spikes.

In the use of the automatic baster cooker of the embodiment of FIGS. 1 and 2, the meat 14 is placed in the cooking receptacle 10 on the bottom thereof with a thin layer of water, wine or other liquid flavoring, shown at 24, which, under the influence of the cooking heat, is vaporized. Of course, instead of placing the meat and the liqiud on the bottom of the receptacle 10, one can place the meat and the liquid in a pan and the latter can then be placed on the bottom of the receptacle. The spikes 18, properly positioned in association with the plate 16, are then pressed into the meat to the predetermined extent. The receptacle 10 is covered with the lid 11 and heat is then applied, as on a stove or, more desirably, in a closed oven. In addition to the cooking effected by the direct application of the heat through the bottom of the receptacle on a stove, or overall in an oven, the liquid 24 is vaporized. The hot vapors rise and fill the upper part of the receptacle. Some of such hot vapors pass below the plate 16 through the apertures 19 in the spikes 18 above the upper surface of the meat 14, and through the top opening in the spikes, and move downwardly through the hollow spikes and pass outwardly through those apertures 19 and through the open bottoms of the spikes which are embedded in the meat and serve to cook and flavor the meat inwardly. Others of said hot vapors strike against the undersurface of the plate 16 and condense and fall downwardly over the top surface of the meat thereby automatically and continuously basting the meat. Basting is initiated as soon as the juices start to simmer. The meat juices which form and partially run off commingle with the liquid 24 and a continuing basting occurs inwardly and outwardly of the meat throughout the cooking operation until the latter is completed. The aforedescribed action continues until the pressure developed inside the meat equals the pressure inside the receptacle 10, at which time the cooking is generally completed.

Cooking tests run with meat roasts and turkeys, for instance, utilizing my invention, as shown in the embodiment of FIGS. 1 and 2, in comparison with conventional cooking procedures by placement of meat roasts or turkeys in a regular roaster oven have shown the following important advantages of my invention:

1. Reduction in shrinkage of the order of about 40 to 50%, and, therefore, the ability to serve more people with a given starting meat roast or turkey.

2. Savings of about 25 to 33% in cooking time and, therefore, also a corresponding saving in gas or electricity used in the cooking.
3. Marked saving in basting time.
4. Avoidance of periodic removal from and return to the oven in connection with ascertaining whether cooking has been completed.
5. The cooked meat roasts or turkeys are characterized by exceptional juiciness, flavor, taste; and tenderness and relative uniformity of such properties through the meat roasts and turkeys.

In the embodiment of FIG. 4, the automatic baster cooker comprises a roaster vessel or cooking receptacle 30 having a closely fitting removable lid or cover 31 which is provided with a grasping knob 32. The bottom 33 of the receptacle is formed with an upstanding wall 34 to form a chamber 36 to hold water, wine or other flavoring liquids 37, for instance of a depth of about 1 or 1½ inches. A vapor seal or cover plate or lid 38 is provided for the chamber 36 and, in the top of said lid 38, there are spaced openings 39, desirably three or more in number, within which elongated spikes or tubular members 41 are supported. A downwardly dished covering or deflector plate 42 having spaced apertures therein serves to carry spaced elongated hollow spikes 43. The nature of the spikes 41 and 43, the perforations therein, and the association of the plate 42 and spikes 43 are like those described in the embodiment of FIGS. 1, 2 and in FIG. 3, and, therefore, additional description is unnecessary. A layer of water or flavoring liquid 44 is also placed in the receptacle 30. Attached to the bottom of the receptacle 30 in any suitable fashion, not shown, is a housing 46 within which is disposed an electrical heating element 47 which is adapted to be connected to a source of electrical current through a conventional electrical plug to provide the heat for effecting the cooking.

In the use of the automatic baster cooker of FIG. 4, water or flavoring liquid is placed in the chamber 36 and also in the bottom of the receptacle 30. The vapor seal lid 38 is then positioned to close the chamber 36, with the spikes 41 extending upwardly. The meat is then pressed downwardly against said spikes until the meat rests against the top surface of said lid 38. The weight of the meat aids in effective closure of said lid 38. Then the spikes 43, properly positioned in association with the plate 42, are pressed into the meat to the predetermined extent. The electrical current is then turned on and cooking and automatic basting are effected.

Figure 5:
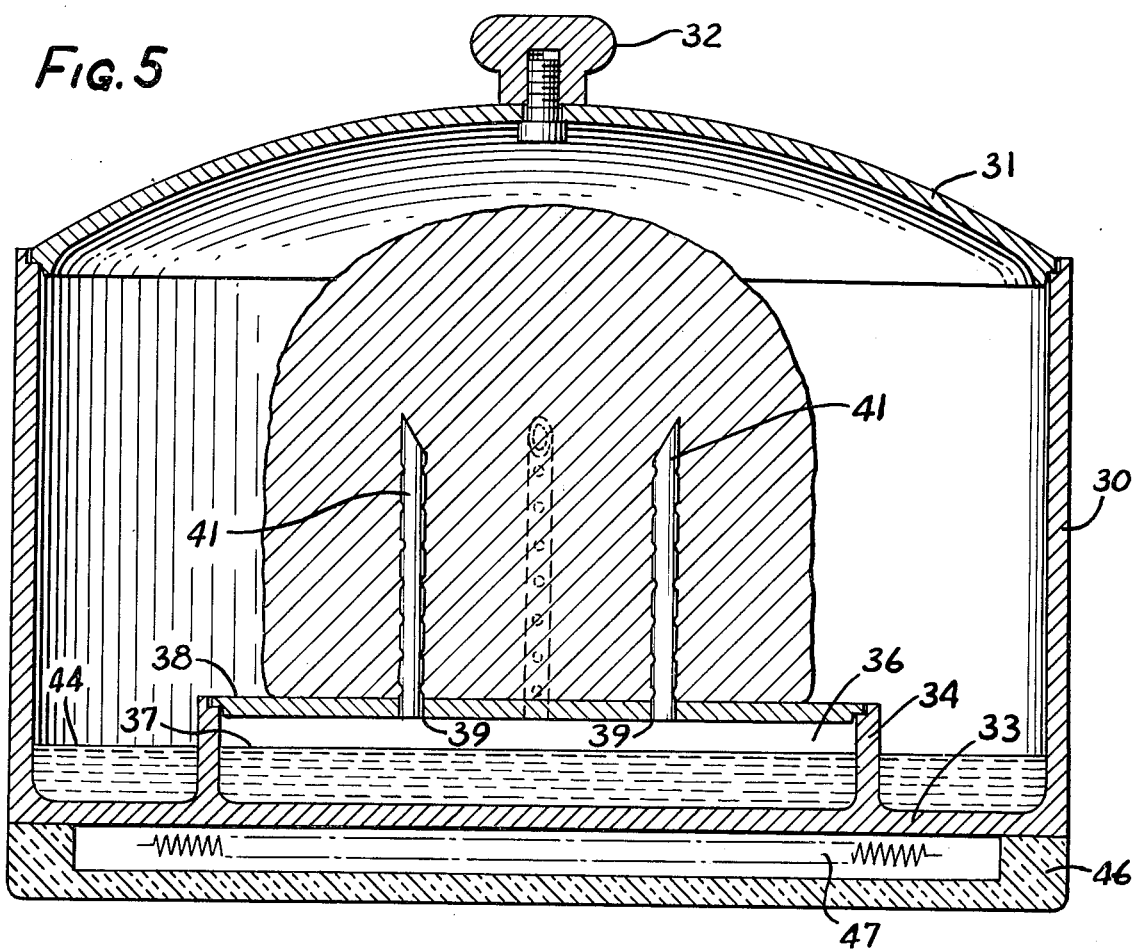
FIG. 5 is a vertical sectional view of still another embodiment of the automatic baster cooker of my invention, similar to that of FIG. 4 but not utilizing a dished covering or deflector plate.

The embodiment of FIG. 5 is similar to that of FIG. 4 except that, in said latter embodiment, the plate 42 and the downwardly extending spikes 43 are not employed. This embodiment, while very useful, is less preferred than that of FIG. 4 so far as the electrically heated embodiment is concerned.

I claim:
1. An automatic baster cooker for meats which includes a cooking receptacle having a closely fitting removable lid, said cooking receptacle serving to house said meat and a layer of a vaporizable liquid adjacent the bottom of said receptacle, a generally downwardly dished covering plate adapted to overlie the top of the meat and to extend around the sides of the upper part of the meat, disposed inside the lidded receptacle in spaced relation to said meat, said dished covering plate having a series of spaced openings in the top thereof, and a plurality of elongated hollow spikes or tubular members having perforations along their lengths, said spikes or tubular member extending through said openings in said dished covering plate and extending downwardly from said dished covering plate and penetrating into the body of said meat.

2. The cooker of claim 1, in which the spikes or tubular members can freely pass through the openings in the dished covering plate whereby to adjust the extent of penetration of said spikes or tubular members into the body of the meat.

3. The cooker of claim 1, in which at least some of the apertures in the spikes or tubular members are substantially diametrically opposite each other.

4. An electrically heated automatic baster cooker for meats which includes a cooking receptacle serving to house said meat and a layer of a vaporizable liquid adjacent the bottom of said receptacle, said receptacle having a closely fitting top cover lid, said cooking receptacle having a bottom closed portion within which an electrical heating member is enclosed, a shallow chamber within said cooking receptacle and positioned above said bottom closed portion, said shallow chamber being adapted to house a vaporizable liquid, a closely fitting lid for said chamber to provide a vapor seal, said last-mentioned lid having a plurality of spaced openings therein, elongated hollow spikes or tubular members having perforations along their lengths, said spikes or tubular members extending through said openings in said last-mentioned lid and extending vertically upwardly from said lid, said spikes or tubular members being adapted to extend interiorly of the meat when the meat is pressed downwardly to rest on the top of said lid.

5. The cooker of claim 4, which includes a generally downwardly dished covering plate, adapted to overlie the top of the meat and to extend around the sides of the upper part of the meat, disposed inside the covered cooking receptacle in spaced relation to said meat.

6. The cooker of claim 5, wherein said dished covering plate has a series of spaced openings in the top thereof, and a plurality of elongated hollow spikes or tubular members extending through said openings in said dished covering plate and extending downwardly from said dished covering plate and penetrating into the body of said meat.

7. The cooker of claim 6, in which the last-mentioned spikes or tubular members can freely pass through the openings in the dished covering plate whereby to adjust the extent of penetration of said spikes or tubular members into the body of the meat.

8. The cooker of claim 6, in which at least some of the apertures in the last-mentioned spikes or tubular members are substantially diametrically opposite each other.

* * * * *